United States Patent
Lin

(10) Patent No.: US 8,184,269 B2
(45) Date of Patent: May 22, 2012

(54) INPUT DEVICE WITH PHOTOSENSITIVE ELEMENTS AND METHOD FOR INPUTTING INFORMATION THEREBY

(76) Inventor: Chih-Hsiung Lin, Jhonghe (TW)

( * ) Notice: Subject to any disclaimer, the term of this patent is extended or adjusted under 35 U.S.C. 154(b) by 184 days.

(21) Appl. No.: 12/777,944

(22) Filed: May 11, 2010

(65) Prior Publication Data
US 2010/0290027 A1    Nov. 18, 2010

(30) Foreign Application Priority Data

May 13, 2009    (TW) ................................ 98115933 A

(51) Int. Cl.
*G01C 3/08* (2006.01)
(52) U.S. Cl. ....... 356/5.01; 356/4.01; 356/5.1; 356/5.15
(58) Field of Classification Search ......... 356/3.01–28.5
See application file for complete search history.

(56) References Cited

U.S. PATENT DOCUMENTS
4,736,247 A * 4/1988 Graham et al. ............... 348/139

FOREIGN PATENT DOCUMENTS
JP    59112207    *    6/1984
JP    59112207 A       6/1984

* cited by examiner

*Primary Examiner* — Luke Ratcliffe

(57) ABSTRACT

A method for inputting information by an input device with photosensitive elements uses laser light to illuminate a target and two photosensitive elements to sense the time at which beams reflected by the target and then reflected respectively by rotatable first and second mirrors, and determines an included angle between a virtual connecting line of the target and the first mirror and a virtual connecting line of the first mirror and the second mirror and an included angle between a virtual connecting line of the target and the second mirror and the virtual connecting line of the first and second mirrors depending on the time, thereby calculating a coordinate of the target and taking it as relative input information, capable of saving the time for obtaining the target's coordinate and the production cost of the input device.

25 Claims, 7 Drawing Sheets

INPUT DEVICE WITH PHOTOSENSITIVE ELEMENTS AND METHOD FOR INPUTTING INFORMATION THEREBY

BACKGROUND OF THE INVENTION

1. Field of the Invention

The present invention relates to an information input device, and more particularly to an input device used for detecting a target's coordinate and taking it as input information.

2. Description of Related Art

A several information input devices detect a target coordinate and takes it as the input information of characters, patterns and symbols corresponding thereto, or takes it as input information of an interactive game machine.

Taiwan Patent No. 1303770 discloses an information input device, including a microprocessor electrically connected to an image capturing device; a mirror is placed in front of a lens of the image capturing device, thereby allowing the image capturing device captures a reference image reflected by the mirror. When the microprocessor detects the image capturing device capturing that a user touches the reference image of at least one input zone of an image, and then generate a corresponding input signal according to the image capturing device capturing that the user touches the input image of the input zones.

Taiwan Patent Publishing No. 200813785 discloses an image position interpretation device, utilizing first and second reflecting mirrors to respectively reflect a target image to at least one lens of a image capturing device, and the target image is respectively captured as first and second images by the lens. A microprocessor processes the first and second images to obtain a corresponding coordinate value in the scope of an input operating face, where a horizontal optical axis of at least one image capturing device is parallel to the input operating face.

U.S. Pat. No. 7,202,860 discloses a coordinate input device working with at least display screen and desk-top surface as the pointing areas thereof, including a pair of cameras positioned in an upper left position and an upper right position of a display screen of a monitor lying close to a plane extending from the display screen of the monitor and views both a side face of an object in contact with a position on the display screen and a predetermined desk-top coordinate detection area to capture the image of the object within the field of view. The coordinate input device also includes a control circuit which calculates the coordinate value of a pointing tool, pointing to a position within a coordinate detection field, based on video signals output from the pair of cameras, and transfers the coordinate value to a program of a computer.

SUMMARY OF THE INVENTION

To increase the speed of the detection and calculation of a target's coordinate and reduce the production cost of an input device, the present invention is proposed.

The main object of the present invention is to provide an input device with photosensitive elements and a method for inputting information thereby, utilizing laser light to illuminate a target, and sensing two beams respectively formed by reflecting a beam reflected from a target through rotatable first and second reflectors so as to obtain two included angles respectively formed between a virtual connecting line of the first reflector and the target and a virtual connecting line of the first reflectors and second reflectors, and between a virtual connecting line of the second reflector and the target and the virtual connecting line of the first and second reflectors thereby calculating a coordinate of the target and taking it as relative input information, ensuring that a target's coordinate acquiring speed can be increased.

Another object of the present invention is to provide an input device with photosensitive elements and an method for inputting information thereby, using two cheaper photosensitive instead of a rather expensive image capturing module, thereby saving the production cost of the input device.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

The present invention proposes an input device with photosensitive elements and a method for inputting information by means thereof; it uses laser light, visible light or infrared light or the like to illuminate a target, and utilizes two photosensitive elements to detect respectively the times at which a beam reflected from a target is reflected by rotatable first reflector and second reflector, thereby determine rotating a angles of the first reflector and second reflector and further calculating to obtain a target's coordinate and taking it as corresponding input information.

Figure 1:
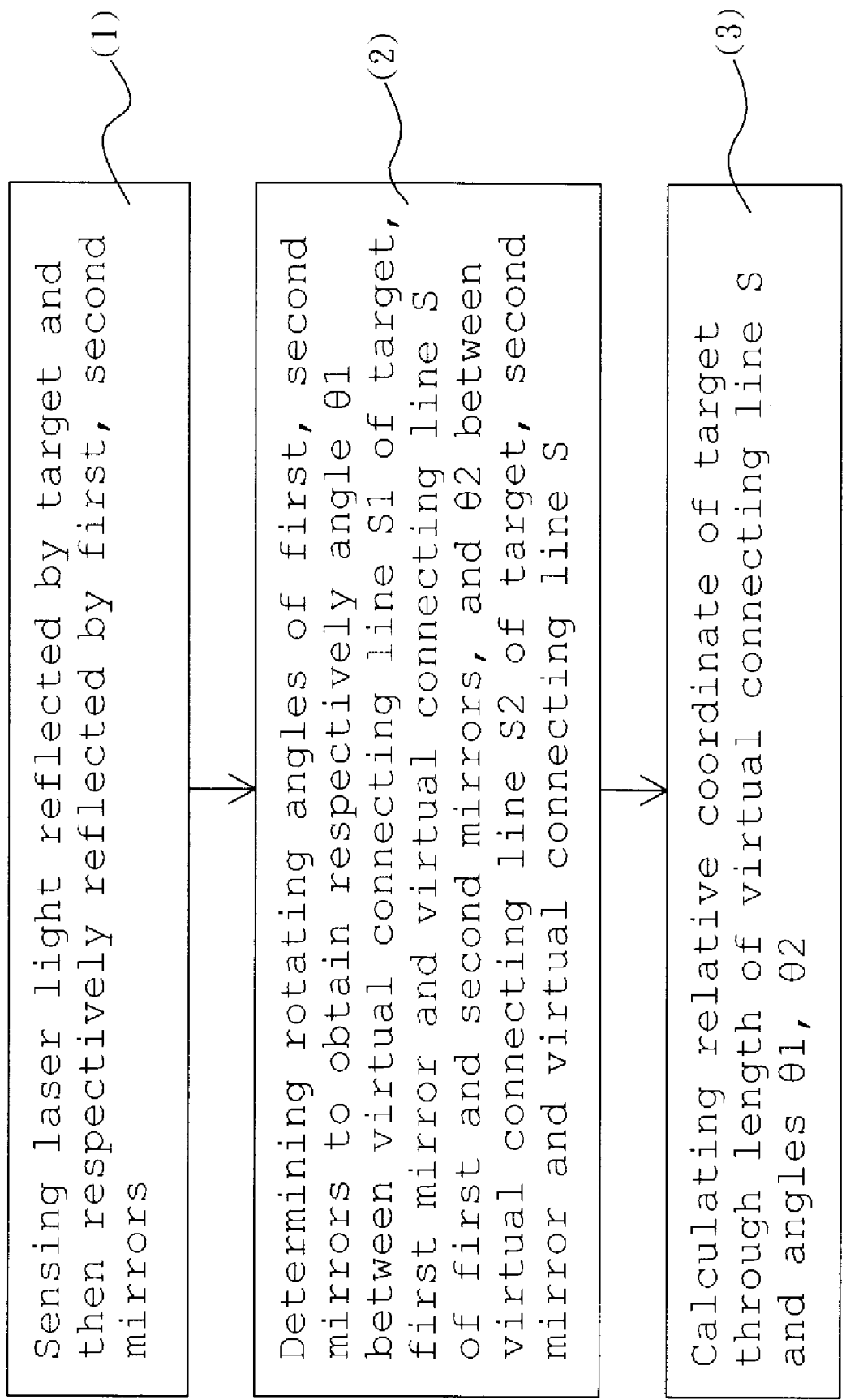
FIG. 1 is a flowchart of a method for inputting information by means of an input device with photosensitive elements according to the present invention.
Figure 2:
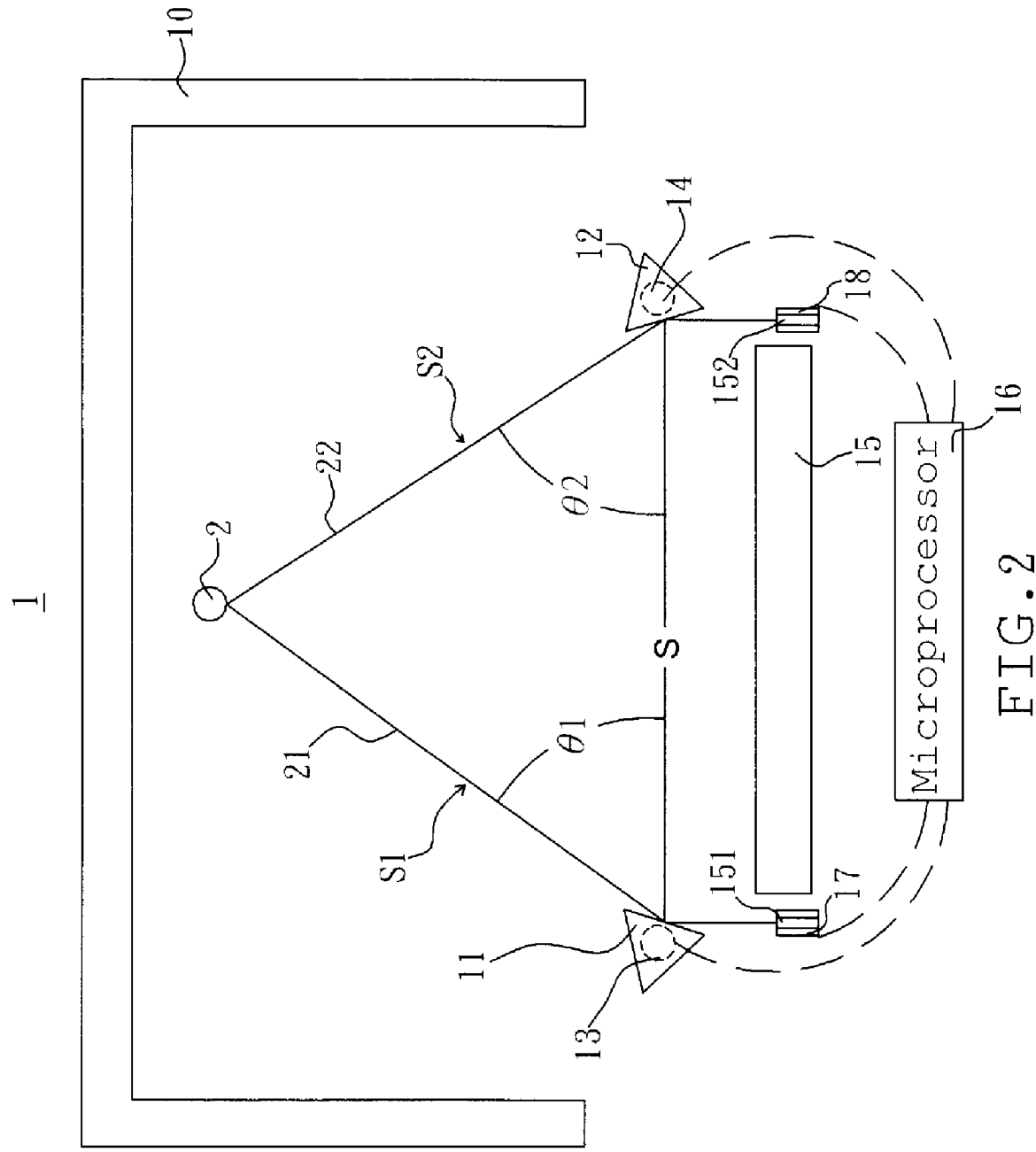
FIG. 2 is a schematic view of an input device with photosensitive elements according to the present invention.
Figure 3:
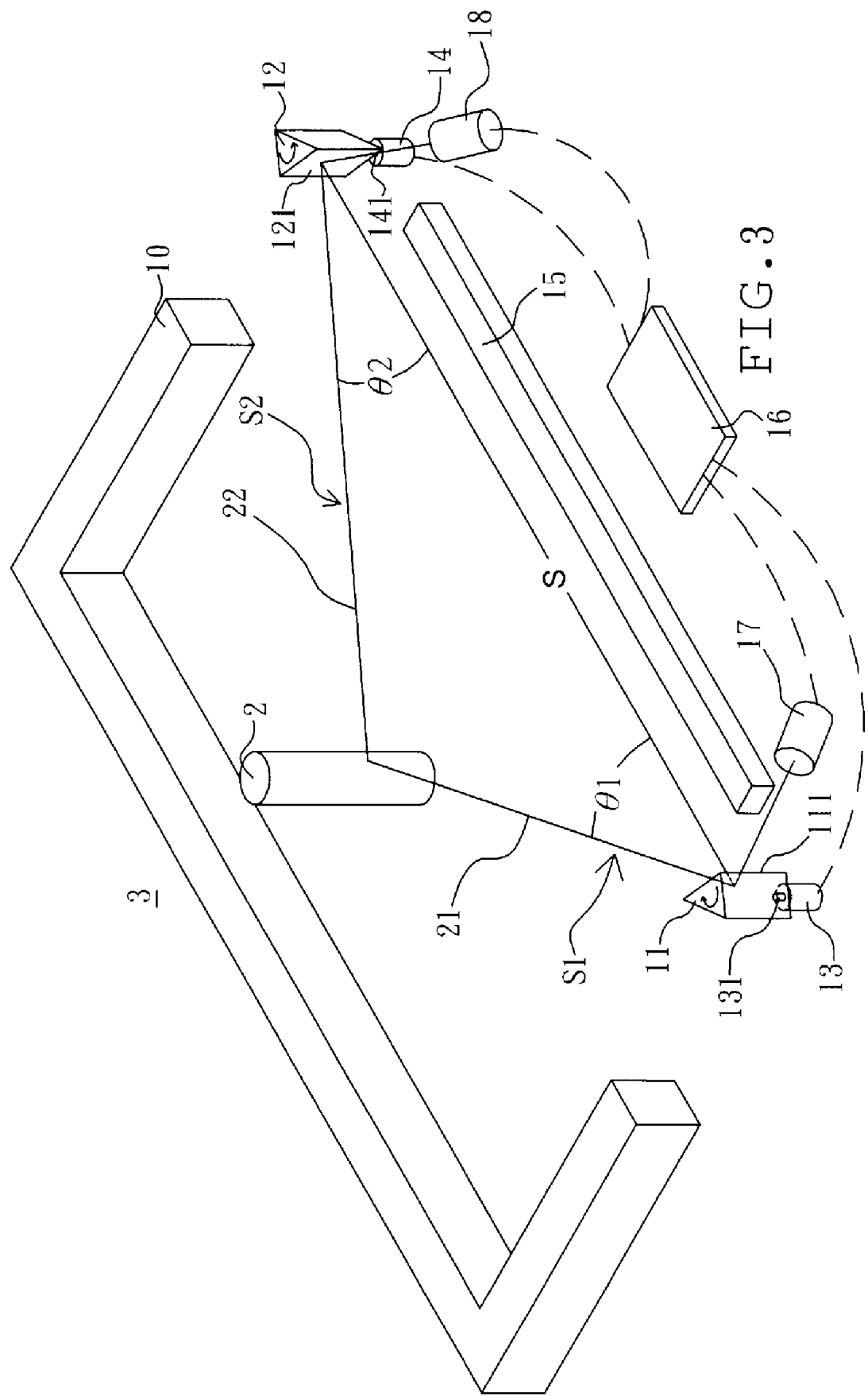
FIG. 3 is a schematic view of an input device with photosensitive elements of a first preferred embodiment according to the present invention.

Referring to FIGS. 1, 2 and 3, an input device 1 having photosensitive elements of the present invention includes a light reflecting or emitting structure 10, a first reflector 11, a second reflector 12, a first motor 13, a second motor 14, a light emitting module 15, a microprocessor 16, a first photosensitive element 17 and a second photosensitive element 18. The light emitting module 15 can be replaced with a first light emitting module 151 and a second light emitting module 152. A rotating shaft 131 of the first motor 13 is coupled to the first reflector 11, thereby driving the first reflector 11 to rotate. A rotating shaft 141 of the second motor 14 is coupled to the second reflector 12, thereby driving the second reflector 12 to rotate. The microprocessor 16 is in wired or wireless connection with the first motor 13, second motor 14, first photosensitive element 17 and second photosensitive element 18, and can detect signals emitted from the aforementioned photosensitive elements. The light emitting module 15 can emit planar light to illuminate a target 2 and the light reflecting or emitting structure 10. The light emitted from the first light emitting module 151 and the second light emitting module 152 illuminates respectively the target 2 and the light reflecting or emitting structure 10 by means of the reflection of the first reflector 11 and the second reflector 12. The target 2 is positioned between the light reflecting or emitting structure 10 and the first reflector 11, second reflector 12. The light emitted from the light reflecting or emitting structure 10 is weaker than the light emitted respectively from the first light emitting module 151 and the second light emitting module 152, but stronger than the light reflected from the target 2. The first motor 13 and the second motor 14 may also be respectively replaced with repeatedly first and second oscillating mechanisms Under a condition without the light reflecting or emitting structure 10, the microprocessor 16 can then detect to obtain the sensing signal outputting times of the first photosensitive element 17 and the second photosensitive element 18 when the first motor 13, second motor 14 drive respectively the first reflector 11 and the second reflector 12 to rotate respectively to a specific angle thereby allowing beams 21, 22 reflected from the target 2 to be respectively reflected to the first and second photosensitive elements 17, 18 by the first and second reflectors 11, 12 to cause the first and second photosensitive elements 17, 18 to output sensing signals. Thereafter, the microprocessor 16 can then determine included angles θ1, θ2 respectively between a virtual connecting line S1 of the target 2 and the first reflector 11 and a virtual connecting line S between the first reflector 11 and the second reflector 12, and between a virtual connecting line S2 of the target 2 and the second reflector 12 and the virtual connecting line S according to the rotating angles of the first and second motors 13, 14 at that time, and then calculate a relative coordinate of the target 2 depending on the virtual connecting line S and the angles θ1, θ2, thereby taking it as input information corresponding to a position of the target 2. The light emitting module 15, first light emitting module 151, second light emitting module 152 may respectively emit laser light, visible light or infrared light. The first and second photosensitive elements 17, 18 may be a photosensitive element such as a photo detector, a photo diode, a photo receiver, a photo transistor and an object capable of the wired or wireless emission of light sensing signals.

The first light emitting module 151 and the second light emitting module 152 are respectively stacked with the first photosensitive element 17 and the second photosensitive element 18. The beams emitting from the first light emitting module 151 and light emitting module 152 can be respectively reflected to the target 2 by the first reflector 11 and the second reflector 12, then reflected to the first reflector 11 and second reflector 12 by the target 2 and further reflected to the first photosensitive element 17 and second photosensitive element 18 by the first reflector 11 and second reflector 12 owing to the far larger speed of light than the rotating speeds of the first reflector 11 and second reflector 12 when the first reflector 11, second reflector 12 are rotated to a specific angle. Therefore, the first photosensitive element 17 and second photosensitive element 18 can still sense the beams 21, 22 reflected from the target 2.

Under a condition having the light reflecting or emitting structure 10, the beams emitted from the first light emitting module 151 and second light emitting module 152 are respectively reflected to the light reflecting or emitting structure 10 by the first reflector 11 and second reflector 12 when they are not blocked by the target 2, and then reflected respectively to the first reflector 11 and second reflector 12 by the light reflecting or emitting structure 10, and further reflected to the first photosensitive element 17 and second photosensitive element 18 respectively by the first reflector 11 and second reflector 12. Because the volume of the light reflecting or emitting structure 10 is larger and the light reflecting performance thereof is better than the target 2 or it can emit light brighter than the light reflected by the target 2, the first photosensitive element 17 and second photosensitive element 18 can respectively sense continuous and brighter light and respectively emit stronger continuous signals. When the first reflector 11, second reflector 12 are respectively rotated to a specific angle, causing the light emitted from the first light emitting module 151 and the second light emitting module 152 to be not respectively reflected to the light reflecting or emitting structure 10 but respectively reflected to the target 2 by the first reflector 11 and second reflector 12 and then reflected by the target 2, or the light emitted from the light reflecting or emitting structure 10 is blocked by the target 2, the first photosensitive element 17 and second photosensitive element 18 can only sense respectively weaker light. The microprocessor 16 outputs respectively the time at which the light is weakest depending on the first photosensitive element 17 and second photosensitive element 18, and then calculate a relative coordinate of the target 2 as mentioned above depending on the rotating angles of the first motor 13 and second motor 14 at that time.

An input method for inputting information by an input device with photosensitive elements of the present invention includes the following steps:

Step 1: sensing, obtaining respectively the time at which the weakest beams 21, 22 are reflected from the rotatable first reflector 11 and second reflector 12 after the beams 21, 22 reflected from the target 2 are further respectively reflected by the reflectors 11, 12.

Step 2: determining rotating angles of the first reflector 11 and the second reflector 12 depending on that time to obtain respectively an included angle θ1 between a virtual connecting line S1 of the first reflector 11 and the target 2 and a virtual connecting line S of the first reflector 11 and the second reflector 12, and an included angle θ2 between a virtual connecting line S2 of the second reflector 12 and the target 2 and the virtual connecting line S.

Step 3: calculating a relative coordinate of the target 2 by means of the length of the virtual connecting line S and the angles θ1, θ2 and taking it as input information corresponding to the position of the target 2.

The method for inputting information by an input device with photosensitive elements includes the corresponding technical content of the input device with photosensitive elements of the present invention described in the specification beside the aforementioned steps, the detail is omitted here.

Referring to FIGS. 2 and 3 again, other structures of an input device 3 with photosensitive elements of a first preferred embodiment according to the present invention are the same as the input device 1 with photosensitive elements shown in FIG. 2 expect without the first light emitting module 151 and the second light emitting module 152 shown in FIG. 1. The first photosensitive element 11 and second photosensitive element 12 of the present embodiment are respectively configured on the horizontal sides of the first reflector 11 and the second reflector 12. The first reflector 11 is disposed with at least one reflecting face 111, and the second reflector 12 is disposed with at least one reflecting face 121; the reflecting face 111 of the first reflector 11 and the reflecting face 121 of the second reflector 12 are respectively parallel to the rotating shafts 131, 141.

Figure 4:
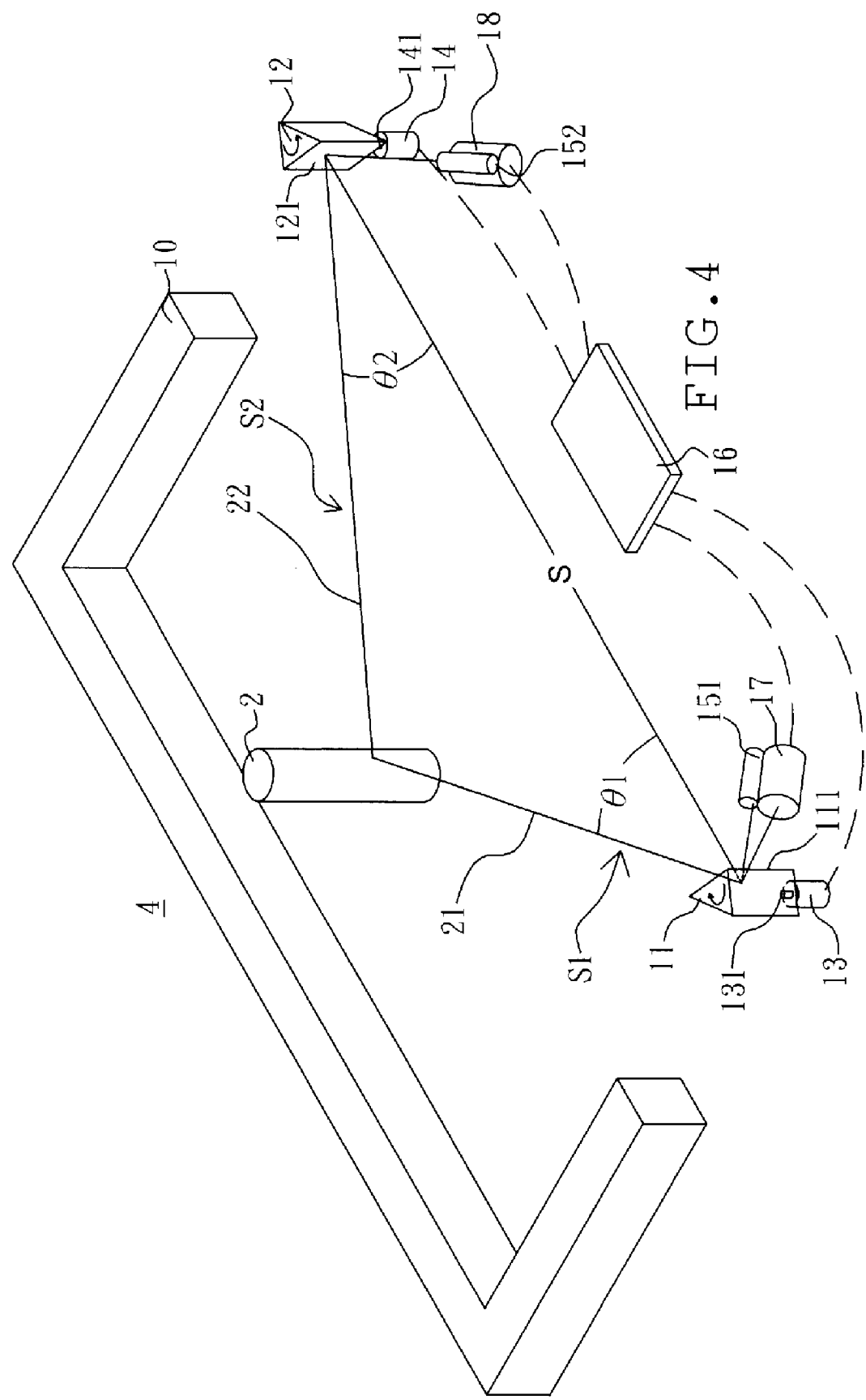
FIG. 4 is a schematic view of an input device with photosensitive elements of a second preferred embodiment according to the present invention.

Referring to FIGS. 2 and 4, other structures of an input device 4 with photosensitive elements of a second preferred embodiment according to the present invention are the same as the input device 1 with photosensitive elements shown in FIG. 2 expect without the light emitting module 15 shown in FIG. 2. The first light emitting module 151, second light emitting module 152 of the present embodiment are respectively stacked with the first photosensitive element 17, second photosensitive element 18. The first light emitting module 151, second light emitting module 152 and the first photosensitive element 17, second photosensitive element are respectively configured on the horizontal sides of the first reflector 11 and second reflector 12. The reflecting face 111 of the first reflector 11, the reflecting face 121 of the second reflector 12 are respectively parallel to the rotating shafts 131, 141.

Figure 5:
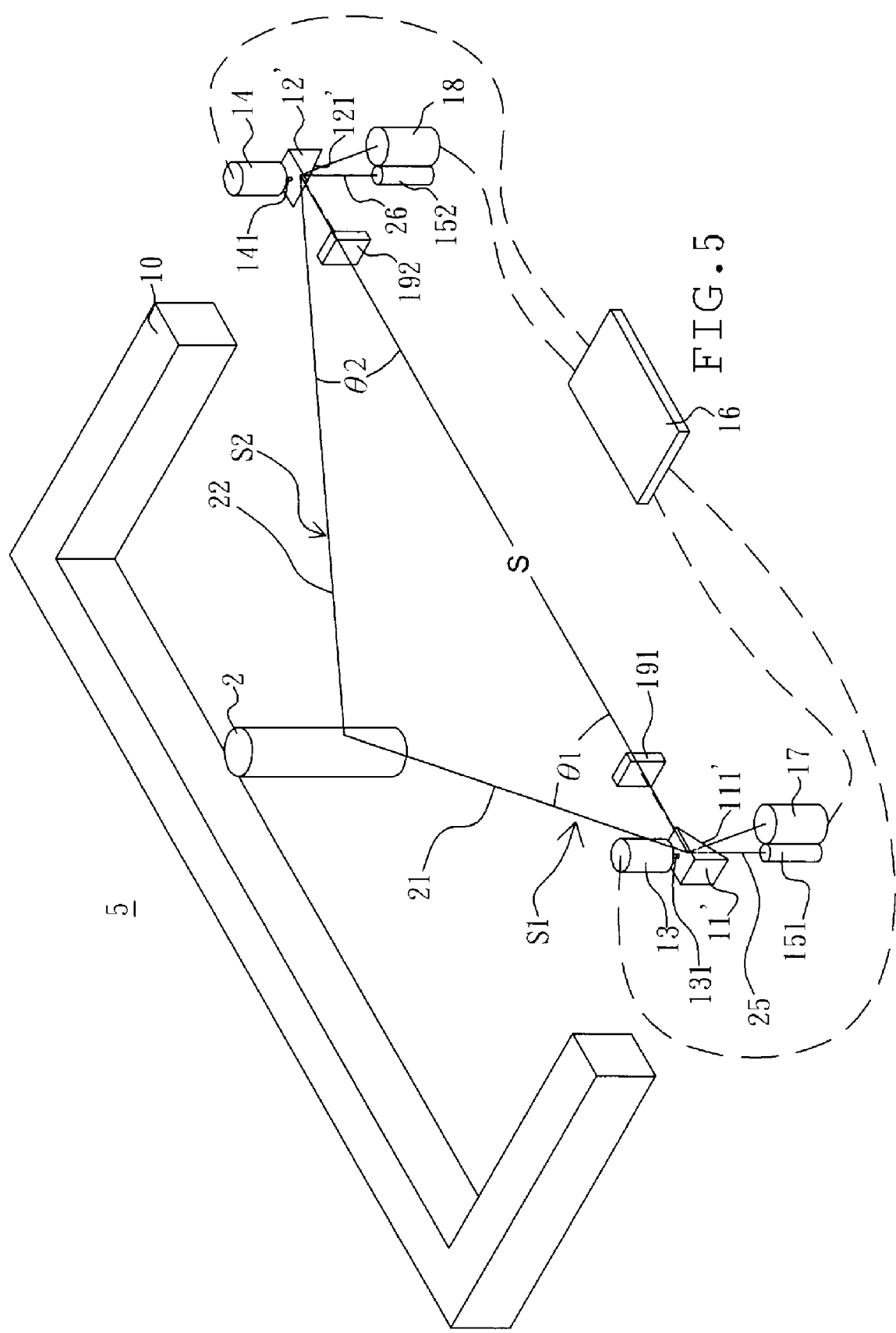
FIG. 5 is a schematic view of an input device with photosensitive elements of a third preferred embodiment according to the present invention.

Referring to FIGS. 2 and 5, other structures of a input device 5 with photosensitive elements of a third preferred embodiment according to the present invention are the same as the input device 1 with photosensitive elements shown in FIG. 2 expect without the light emitting module 15 shown in FIG. 2. The first light emitting module 151, second light emitting module 152 of the present embodiment are respectively stacked with the first photosensitive element 17, second photosensitive element 18. The first light emitting module 151, second light emitting module 152 and the first photosensitive element 17, second photosensitive element are respectively configured on the vertical sides of a first reflector 11' and second reflector 12'. A reflecting face 111' of the first reflector 11', a reflecting face 121' of the second reflector 12 are respectively formed 45 degrees with the rotating shafts 131, 141. The first reflector 11', second reflector 12' may respectively be a prism.

Figure 6:
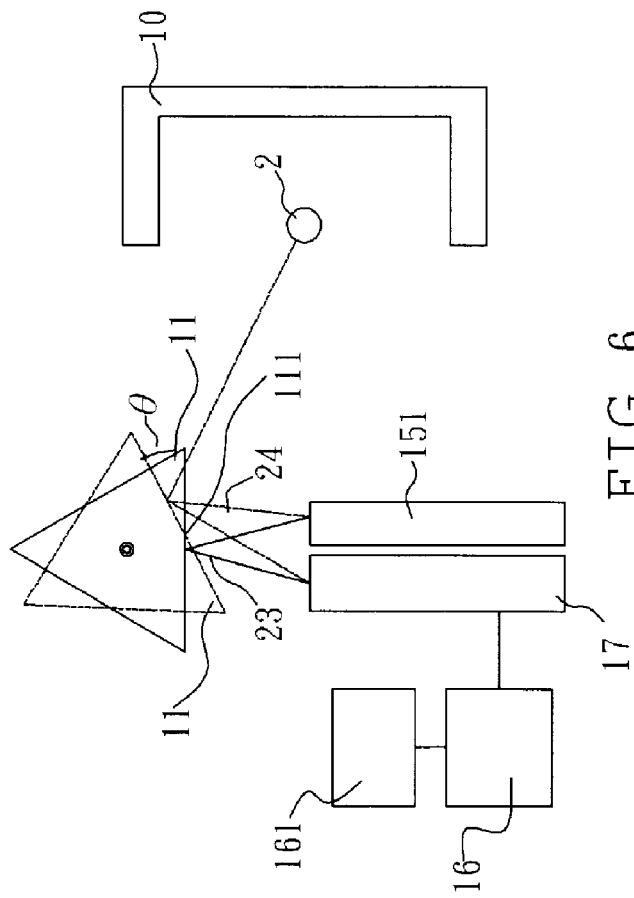
FIG. 6 is a schematic view of the detection of the angle rotation of a first reflector according to the present invention.
Figure 7:
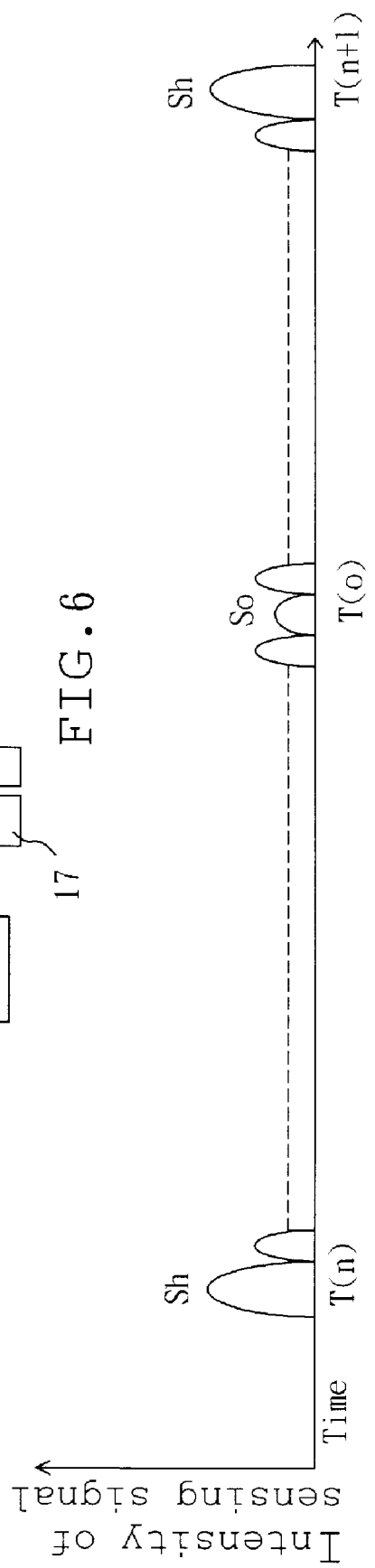
FIG. 7 is a schematic view of the detection of a first photosensitive element according to the present invention.

Referring to FIGS. 4, 6 and 7, the present invention also allows the microprocessor 16 to be connected to a timer 161, thereby calculating respectively the rotating angles of the first reflector 11 and the second reflector 12 by means of a time difference between the times at which the largest sensing signal and the weakest sensing signal are emitted from the first photosensitive element 17, second photosensitive element 18 without needing to obtain respectively the rotating angles of the first reflector 11 and second reflector 12 by means of the rotating angles of the first motor 13 and second motor 14.

Taking the first reflector 11, the first light emitting module 151, the first photosensitive element 17 as an example and disposing the first reflector 11 with m equiangularly distributed reflecting faces 111 to explain a method for detecting a rotating angle of the first reflector 11, the first photosensitive element 17 can sense the beam 23 emitted form the first light emitting module 151 and then reflected directly by one reflecting face 111 of the first reflector 11 in sequence to obtain respectively the strongest sensing signal Sh when the first reflector 11 is rotated; the microprocessor 16 records the times T(n), T(n+1) and etc at which the strongest sensing signal Sh is detected, where the time difference between the two adjacent time (T(n+1)−T(n)) is equal to the time needed for the 1/m cycle (360 degree/m) rotation of the first reflector 11, where n, m are integer 1, 2, 3 . . . ; when the first photosensitive element 17 senses the light emitted from the first light emitting module 151, reflected to the light reflecting or emitting structure 10 of the one reflecting face 111 of the first reflector 11 through the first reflector 11 and then reflected by the light reflecting or emitting structure 10, or the light emitted from the light emitted from the light reflecting or emitting structure 10 and then reflected by one reflecting face 111 of the first reflector 11 between the adjacent times T(n) and time T(n+1), a weaker sensing signal S0 can be obtained; it is because the light reflecting function of the target 2 is weaker than the light reflecting or emitting structure 10 or the light emitted from the light reflecting or emitting structure 10 is brighter than the light reflected from the target 2, and the light emitted from the light reflecting or emitting structure 10 is blocked by the target 2 and cannot be reflected to the first photosensitive element 17 by the first reflector 11; the microprocessor 16 records the time T(0) at which the weakest sensing signal S1 is detected through the time provided by the timer 161; because the rotation of the first reflector 11 is close to a uniform motion, a rotating angle θ of the first reflector 11 as a function of time T(0) relative to time T(n) can be calculated as (T(0)−T(n))/(T(n+1)−T(n)) multiplied by 360/m.

Figure 8:
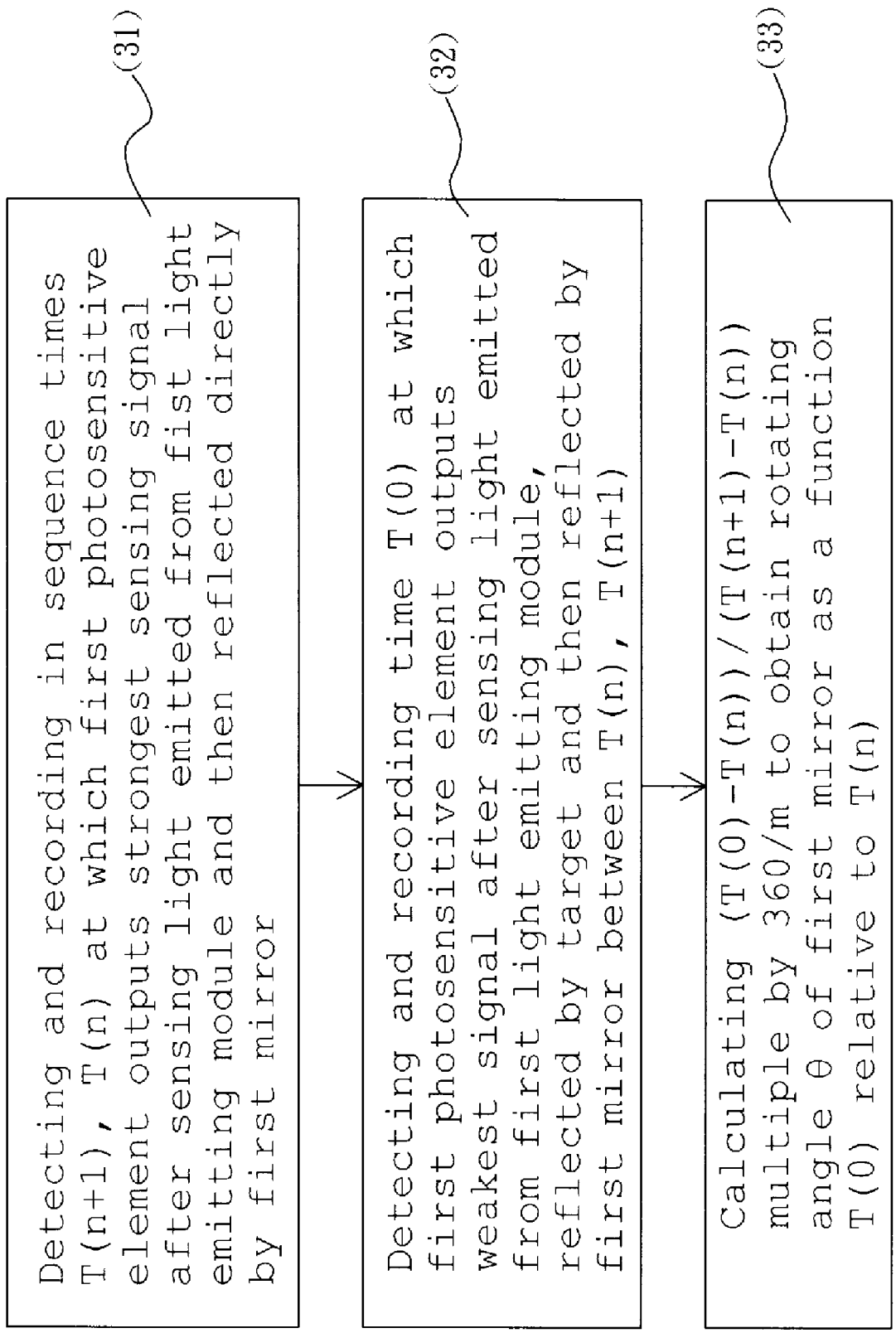
FIG. 8 is a flow chart of a detection method of the angle rotation of the first reflector according to the present invention.

Referring to FIGS. 6, 7 and 8, a method for detecting a rotating angle of the first reflector 11 according to the present invention includes the following steps:

Step 31: allowing the microprocessor 16 to record the two times T(n), T(n+1) at which the strongest sensing signal Sh respectively emitted from the first photosensitive element 17 is detected by means of the time provided by the timer 161, where the two strongest sensing signals are generated from the sensing of the beam 23 emitted from the first light emitting module 151 and then reflect directly by one reflecting face 111 of the first reflector 11; a time difference (T(n+1)−T(n)) is equal to the time needed for the 1/m cycle (360/m) rotation of the first reflector 11;

Step 32: allowing the microprocessor 16 to record time T(0) at which the weakest sensing signal 51 emitted from the first reflector 11 is detected by means of the time provided by the timer 161, where the weakest sensing signal S1 is generated from the sensing of the beam 24 emitted from the first light emitting module 151, reflected to the target 2 by the first reflector 11, reflected to one reflecting face 111 of the first reflector 11 and then reflected by the reflecting face 111 by the photosensitive element 17 between the adjacent times T(n) and T(n+1);

Step 33: allowing the microprocessor 16 to calculate (T(0)−T(n))/(T(n+1)−T(n)) multiplied by 360/m, thereby obtaining a rotating angle θ of the first reflector 11 as a function of time T(0) relative to time T(n), and determining the rotating angle of the first reflector 11 depending on the rotating angle θ.

Referring to FIGS. 4, 6, 7 and 8, the method for detecting the rotating angle of the first reflector 11 of the present invention is also applied to the detection of a rotating angle of the second reflector 12; defining times corresponding to T(n), T(n+1), T(0) for calculating the rotating angle of the second reflector respectively as T(p). T(p+1), T(q), (T(q)−T(p))/(T(p+1)−T(p)) multiplied by 360/r can be calculated to obtain a rotating angle of the second reflector 12 as a function of time T(q) relative to time T(p), and the rotating angle of the second reflector 12 can be determined depending on the rotating angle mentioned above, where p, r respectively are an integer 1, 2, 3 . . . , the second reflector 12 is disposed with r equiangularly distributed reflecting faces 121, and r may also be equal to m.

Referring to FIG. 5 again, in the input device 4 with photosensitive elements the third embodiment of the present invention, because the first light emitting module 151, the second light emitting module 152 and the first photosensitive element 17, the second photosensitive element 18 are respectively disposed on the vertical sides of the first reflector 11', the second reflector 12', and the reflecting face 111' of the first reflector 11', the reflecting face 121' of the second reflector 12' are respectively formed 45 degrees with the beams 25, 26 emitted respectively from the first light emitting module 151, the second light emitting module 152, the first photosensitive element 17, the second photosensitive element 18 are unable to sense the beams emitted respectively from the first light emitting module 151, the second light emitting module 152 and reflected directly by the reflecting face 111' of the first reflector 11', the reflecting face 121' of the second reflector 12' to send the strongest signals; the reflected beams must be respectively sensed through a first mirror 191, a second mirror 192 shown in the figure. Because the first mirror 191, second mirror 192 respectively have a better light reflecting effect than the target 2, in the present embodiment, the first photosensitive element 17, the second photosensitive element 18 are used to sense respectively the beams emitted respectively from the first light emitting module 151, the second light emitting module 152, reflected respectively to the first mirror 191, the second mirror 192 by the reflecting face 111' of the first reflector 11', the reflecting face 121' of the second reflector 12', reflected respectively to the reflecting face 111' of the first reflector 11', the reflecting face 121' of the second reflector 12' by the first mirror 191, the second mirror 192 and then reflected by the reflecting face 111' of the first reflector 11', the reflecting face 121' of the second reflector 12', thereby obtaining the strongest sensing signal. Therefore, the strongest signal in the present embodiment is obtained by means of the method mentioned above.

The detection method of the rotating angles of the first reflector 11 and the second reflector 12 of the present invention includes the technical content related to the detection of the rotating angles of the first reflector 11 and the second reflector 12 of the present invention in the specification besides the operating steps mentioned above; the detailed is omitted here.

The present invention does not need to rely on the rotating angles of precise, expensive stepper motors to not only obtain the rotating angles of the first reflector 11 and the second reflector 12 but differentiate between the rotating angles of the first reflector 11 and the second reflector 12 more precisely and obtain the position of the target 2 more accurately. For example, the present invention uses cheaper motors of 60 revolutions per sec to drive the first reflector 11 with only one reflecting face 111 to rotate such that the facilities cost thereof is cheaper. Furthermore, the present invention provides a timer 161 with a system timing clock oscillation frequency of 72 million times such that each turn of the motor is divided into 72,000,000/60=1,200,000 divisions; and 360 degrees=360*60*60=1,290,200 seconds. Therefore, the angle can be divided by each unit time interval (1/72 million second) is 1,290,000/1,200,000=1.08 seconds; it is very accurate. Besides, the accuracy of the angle detection can be increased if a timer 161 with a larger oscillation frequency is used.

The input device with photosensitive elements and the method for inputting information thereby according to the present invention only uses two cheaper photosensitive elements instead of expensive image capturing modules such that the production cost of the device can be reduced. Furthermore, the included angles between the virtual connecting lines S of a target and the first, second reflectors can respectively obtained easily through the rotating angles of the rotating shafts of the motors to calculate to obtain the coordinate of the target simply and fast instead of a complex, time-consuming operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An input method with photosensitive elements comprising the following steps:
   a. sensing and recording a beam reflected by a target and then reflected by a first and second rotatable reflectors respectively, and obtaining time needed for detecting the minimum brightness in the beam;
   b. determining rotating angles of said first and second reflectors depending on said time to obtain a first included angle between a first virtual connecting line extending from said first reflector to said target and a second virtual connecting line extending from said first reflector to said second reflector, and a second included angle between a third virtual connecting line extending from said second reflector to said target and said second virtual connecting line; and
   c. calculating relative coordinates of said target with said second virtual connecting line and said first and second included angles and taking said coordinates as input information corresponding to a position of said target.

2. The input method according to claim 1, wherein step (a) further comprises using at least one light emitting module to emit the beam to illuminate said target; using a first photosensitive element, and a second photosensitive element to sense the beam respectively.

3. The input method according to claim 2, wherein step (a) further comprises using a first motor, and a second motor to drive said first and second reflectors respectively.

4. The input method according to claim 3, wherein step (b) further comprises using a microprocessor to detect the beams after the beam being sensed by said first and second photosensitive elements, to output the time when a sensing signal corresponding to the minimum brightness is sensed, and to determine rotating angles of said first and second reflectors depending on rotating angles of said first motor, and said second motor at said time respectively.

5. The input method according to claim 4, wherein determining the rotating angle of said first reflector in step (b) further comprises following steps:
   a1. said microprocessor recording two time values denoted by two symbols T(n), T(n+1) sequentially with time counted by a timer to correspond to two strongest sensing signals emitted by said first photosensitive element, wherein said two strongest sensing signals are generated from the first photosensitive element sensing the beam which is either reflected directly by one of reflecting faces of said first reflector after being emitted by said first light emitting module or reflected to a first mirror by one of the reflecting faces of said first reflector, then reflected back to said reflecting face by said first mirror and further reflected by said reflecting face after being emitted by said first light emitting module; a time difference (T(n+1)−T(n)) between said two time values T(n), and T(n+1) is equal to a fraction 1/m of a complete cycle of rotation of said first reflector, where n, and m are natural numbers, and said first reflector has m reflecting faces;
   b1. said microprocessor recording a time value denoted with a symbol T(0) which is disposed between the time values T(n) and T(n+1) to correspond to a weakest sensing signal emitting from said first photosensitive element and detected by means of time counted by said timer, wherein said weakest sensing signal is generated from the first photosensitive element sensing said beam which is reflected to said target by said first reflector, then reflected to said first reflector by said target, and further reflected by said first reflector after being emitted by said first light emitting module; and c1. said microprocessor calculating a relative rotating angle of said first reflector with an expression $(T(0)-T(n))/(T(n+1)-T(n)) \times 360/m$, and determining the rotating angle of said first reflector depending on said relative rotating angle.

6. The input method according to claim 5, wherein determining the rotating angle of said second reflector in step (b) further comprises following steps:

a2. said microprocessor recording two time values denoted with symbols $T(p)$, $T(p+1)$ sequentially to correspond to the two strongest sensing signals emitting from said second photosensitive element and detected by means of time counted by a timer, wherein said two strongest sensing signals are generated from the second photosensitive element sensing the beam which is either reflected directly by one of reflecting faces of said second reflector after being emitted by said second light emitting module, or reflected to a second mirror by one of the reflecting faces of said second reflector, then reflected back to said one reflecting face of said second reflector by said second mirror, and further reflected by said reflecting face after being emitted by said second light emitting module; a time difference $(T(p+1)-T(p))$ between said time values $T(p)$ and $T(p+1)$ is equal to a fraction $1/r$ of a complete cycle of rotation of said second reflector, where p, and r are natural numbers, and said second reflector has r reflecting faces;

b2. said microprocessor recording a time value denoted with a symbol $T(q)$ between the time values $T(p)$ and $T(p+1)$ to correspond to the weakest sensing signal emitting from said second photosensitive element and detected by means of time counted by said timer, wherein said weakest sensing signal is generated from the second photosensitive element sensing the beam which is reflected to said target by said second reflector, then reflected to said second reflector by said target and further reflected by said second reflector after being emitted by the second light emitting module; and c2. said microprocessor calculating a relative rotating angle of said second reflector with an expression $(T(q)-T(p))/(T(p+1)-T(p)) \times 360/r$ and determining the rotating angle of said second reflector depending on said relative rotating angle.

7. The input method according to claim 6, wherein said first photosensitive element, and said second photosensitive element are respectively disposed next to lateral sides of said first and second reflectors horizontally, the two strongest signals are generated from the first and second photosensitive elements sensing the beam which is emitted by the respective light emitting module, reflected directly by one of the reflecting faces on the respective reflector.

8. The input method according to claim 7, wherein said first and second light emitting modules are respectively stacked with said first and second photosensitive elements.

9. The input method according to claim 6, wherein said first and second photosensitive elements are respectively disposed next to lateral sides of said first and second reflectors vertically; the two strongest signals are generated from the respective photosensitive element sensing the beam which is reflected directly to the respective mirror by one of the reflecting faces of the respective reflector, then reflected back to the respective reflecting face by the respective mirror, and further reflected by the respective reflecting face after being emitted by the respective light emitting module.

10. The input method according to claim 9, wherein the respective light emitting module is stacked with the respective photosensitive element.

11. The input method according to claim 4, wherein step (c) further comprises said microprocessor calculating relative coordinates of said target depending on said second virtual connecting line and said first and second included angles.

12. The input method according to claim 11, wherein said beam is one of laser light, visible light and infrared light.

13. An input device for detecting, and calculating relative coordinates of a target as input information corresponding to a position of the target comprising:

a first reflector;
a second reflector;
a first motor having a first rotating shaft coupled to said first reflector for rotating said first reflector;
a second motor having a second rotating shaft coupled to said second reflector for rotating said second reflector;
at least one light emitting module;
a first photosensitive element;
a second photosensitive element; and
a microprocessor electrically connecting with said first motor, said second motor, said first photosensitive element and said second photosensitive element;
wherein said light emitting module emits a beam to illuminate said target; said first and second photosensitive elements sense the beam which is reflected by said target and then reflected by the respective reflector, and output respectively a weakest sensing signal corresponding to the beam; said microprocessor detects the respective weakest sensing signal, obtains time at which the respective weakest sensing signal is output by the respective photosensitive element, determines rotating angles of said first and second reflectors, thereby a first included angle between a first virtual connecting line extending from said target to said first reflector and a second virtual connecting line extending from said first reflector to said second reflector, and a second included angle between a third virtual connecting line extending from said target to said second reflector and said second virtual connecting line are obtained; said microprocessor calculates relative coordinates of said target depending on the virtual connecting line, and the included angles, and takes said relative coordinates as input information corresponding to the position of said target.

14. The input device according to claim 13, wherein said first and second photosensitive elements are respectively disposed at lateral sides of said first and second reflectors horizontally; said microprocessor determines the rotating angles of said first and second reflectors, depending on rotating angles of said first and second motors at the time of detecting the respective weakest sensing signal.

15. The input device according to claim 14 further comprises a light reflecting or emitting structure; said target is positioned between said light reflecting or emitting structure and said first and second reflectors, for the beam emitted by said light emitting module to be respectively reflected to said light reflecting or emitting structure by said first and second reflectors, then reflected respectively to said first and second reflectors by said light reflecting or emitting structure, and further reflected to said first and second photosensitive elements by said first and second reflectors; a beam emitting from said light reflecting or emitting structure is weaker than the beam emitting from said light emitting module, but stronger than said beams- reflected by said target.

16. The input device according to claim 14 further comprises a first light emitting module, and a second light emitting module; wherein said first and second photosensitive elements are respectively disposed next to lateral sides of said first and second reflectors horizontally; said first and second light emitting modules are respectively disposed next to the lateral sides of said first and second reflectors horizontally; said microprocessor records two time values denoted with symbols $T(n)$, $T(n+1)$ sequentially to correspond to two strongest sensing signals emitted by said first photosensitive element, detects the strongest sensing signals by means of time counted by a timer, wherein said two strongest sensing signals are generated from the first photosensitive element sensing the beam reflected directly by one of reflecting faces of said first reflector after being emitted by the first light emitting module; a time difference $(T(n+1)-T(n))$ between said time values $T(n)$, and $T(n+1)$ is equal to a fraction $1/m$ of a complete cycle of rotation of said first reflector, where n, and m are natural numbers, and said first reflector has m reflecting faces; said microprocessor records a time value denoted with a symbol $T(0)$ between the time values $T(n)$ and $T(n+1)$ to correspond to the weakest sensing signal emitted by said first reflector, and detects the weakest sensing signal by means of time counted by said timer; said weakest sensing signal is generated from the first photosensitive element sensing said beam which is reflected to said target by said first reflector, then reflected to said first reflector by said target and further reflected by said first reflector after being emitted by the first light emitting module; said microprocessor calculates a relative rotating angle of said first reflector with an expression $(T(0)-T(n))/(T(n+1)-T(n)) \times 360/m$ and determines the rotating angle of said first reflector depending on said relative rotating angle.

17. The input device according to claim 16, wherein said microprocessor records two time values denoted with symbols $T(p)$, $T(p+1)$ at which the to correspond to two strongest sensing signals emitted by said second photosensitive element, and detects said two strongest sensing signal with time counted by the timer, wherein said two strongest sensing signals are generated from said second photosensitive element sensing the beam which is reflected directly by one of reflecting faces of said second reflector after being emitted by said second light emitting module; a time difference $(T(p+1)-T(p))$ between said two time values $T(p)$, and $T(p+1)$ is equal to a fraction $1/r$ of a complete cycle of rotation of said second reflector, where p, and r are natural numbers, and said second reflector has r reflecting faces; said microprocessor records a time value indicated with a symbol $T(q)$ which is between said two time values $T(p)$ and $T(p+1)$ to correspond to the weakest sensing signal emitted by said second photosensitive element, and detects the weakest sensing signal with time counted by said timer; said weakest sensing signal is generated from the second photosensitive element sensing said-beam which is reflected to said target by said second reflector, then reflected to said second reflector by said target, and further reflected by said second reflector after being emitted by the second light emitting module; said microprocessor calculates a relative rotating angle of said second reflector with an expression $(T(q)-T(p))/(T(p+1)-T(p)) \times 360/r$ and determines the rotating angle of said second reflector depending on said relative rotating angle of said second reflector.

18. The input device according to claim 17, wherein said first light emitting module, and second light emitting module are respectively stacked with said first photosensitive element, said second photosensitive element.

19. The input device according to claim 13, wherein one of the reflecting faces of said first reflector is parallel to the first rotating shaft, and one of the reflecting faces of said second reflector is parallel to the second rotating shaft.

20. The input device according to claim 13 further comprises a first light emitting module, and a second light emitting module; wherein said first and second photosensitive elements are respectively disposed at lateral sides of said first and second reflectors vertically; said first and second light emitting modules are respectively disposed at lateral sides of said first and second reflectors vertically; said microprocessor records two time values denoted with two symbols $T(n)$, $T(n+1)$ to correspond to two strongest sensing signals respectively emitted by said first photosensitive element and detected by means of time counted by a timer, wherein said two strongest sensing signals are generated from the first photosensitive element sensing the beam which is reflected to a first mirror by one of reflecting faces of said first reflector, then reflected back to said reflecting face by said first mirror, and further reflected by said reflecting face after being emitted by the first light emitting module; a time difference $(T(n+1)-T(n))$ between said time values $T(n)$, and $T(n+1)$ is equal to a fraction $1/m$ of a complete cycle of rotation of said first reflector, where n, and m are natural numbers, and said first reflector has m reflecting faces; said microprocessor records a time value indicated with a symbol $T(0)$ between said two time values $T(n)$ and $T(n+1)$ to correspond to the weakest sensing signal emitted by said first photosensitive element and detected by means of time counted by said timer, said weakest sensing signal is generated from the first photosensitive element sensing said beam which is reflected to said target by said first reflector, then reflected to said first reflector by said target, and further reflected by said first reflector after being emitted by the first light emitting module; said microprocessor calculates a relative rotating angle of said first reflector with an expression $(T(0)-T(n))/(T(n+1)-T(n)) \times 360/m$ and determines the rotating angle of said first reflector depending on said relative rotating angle.

21. The input device according to claim 20 further comprises a light reflecting or emitting structure; wherein said target is positioned between said light reflecting or emitting structure and said first and second reflectors for the beam emitted said light emitting module to be respectively reflected to said light reflecting or emitting structure by said first and second reflectors, then reflected respectively to said first and second reflectors by said light reflecting or emitting structure, and further reflected to said first and second photosensitive elements by said first and second reflectors; said beam emitted from said light reflecting or emitting structure is weaker than said beams emitted from said light emitting module, but stronger than said beams- reflected by said target.

22. The input device according to claim 21, wherein said first light emitting module, said second light emitting module are respectively stacked with said first photosensitive element, said second photosensitive element.

23. The input device according to claim 22, wherein one of reflecting faces of said first reflector, and one of reflecting faces of said second reflector are respectively disposed to incline 45 degrees with said first rotating shaft and said second rotating shaft.

24. The input device according to claim 23, wherein said first reflector, said second reflector are prisms.

25. The input device according to claim 24, wherein said beam is one of laser light, visible light and infrared light.

* * * * *